United States Patent
Chow

(10) Patent No.: US 6,909,725 B1
(45) Date of Patent: Jun. 21, 2005

(54) IMPLEMENTATION OF HPNA 2.0 NETWORK STATES IN HARDWARE

(75) Inventor: Peter Ka-Fai Chow, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 861 days.

(21) Appl. No.: 09/815,917

(22) Filed: Mar. 23, 2001

(51) Int. Cl.$^7$ ................................................ H04J 3/16
(52) U.S. Cl. .................... 370/467; 370/509; 370/438; 370/709; 370/250
(58) Field of Search ................................ 370/467, 466, 370/465, 254, 255, 241, 351, 352, 468, 469, 470, 471, 472, 473, 503, 509; 709/250, 220, 230, 231

(56) References Cited

U.S. PATENT DOCUMENTS

| | | | | |
|---|---|---|---|---|
| 6,094,441 A | * | 7/2000 | Jung et al. | 370/466 |
| 6,269,104 B1 | * | 7/2001 | McLaughlin et al. | 370/464 |
| 6,292,467 B1 | * | 9/2001 | Keller | 370/241 |
| 6,421,735 B1 | * | 7/2002 | Jung et al. | 709/250 |
| 6,496,869 B1 | * | 12/2002 | Cheng | 709/250 |
| 6,768,720 B1 | * | 7/2004 | Kamstra et al. | 370/245 |
| 2002/0126693 A1 | * | 9/2002 | Stark et al. | 370/463 |
| 2003/0072316 A1 | * | 4/2003 | Niu et al. | 370/412 |

* cited by examiner

*Primary Examiner*—Phirin Sam
*Assistant Examiner*—Anthony Ton
(74) *Attorney, Agent, or Firm*—Winstead Sechrest & Minick P.C.

(57) ABSTRACT

A network state machine which implements the three network states of HPNA 2.0 in hardware has been disclosed. The network state machine implements the three network states using two network states. When a station is in the V1M2 mode, instead of transmitting this frame in the 10M8 format frame with the gap frame, the frame is transmitted in the 1M8 format frame without any gaps in the frame. By implementing this in hardware, the network state machine has a faster response time.

36 Claims, 4 Drawing Sheets

IMPLEMENTATION OF HPNA 2.0 NETWORK STATES IN HARDWARE

FIELD OF THE INVENTION

The present invention relates to computer network, and more particularly to the handling of network states in a home phone line network.

BACKGROUND OF THE INVENTION

Home networks are becoming more common and desirable for connecting computers within a home. One type of home network is the home phone line network which uses telephone lines typically installed in residence homes for communication between computers in the home.

FIG. 1 illustrates a home phone line network. The Home Phone Line Networking Alliance (HPNA) has published a specification to standardize the behavior of home phone line networks. The current HPNA specification is version 2.0 ("HPNA 2.0"). The network comprises a control chip 100. The chip 100 further comprises a Media Independent Interface (MII) 106, a Media Access Control (MAC) 108, and a Physical Layer (PHY) 110. The chip 100 implements HPNA 2.0. The chip 100 receives a signal containing data packets through the telephone wires via a phone jack 102. There is an analog front end (AFE) 104 which processes the signal between the chip 100 and the telephone wires. The chip 100 then processes the packets received in the signal from the AFE 104, and outputs a signal to the Host MAC 112.

Under HPNA 2.0, stations in the network supports a 10 megabits-per-second (mbps) data rate and/or a 1 mbps data rate, depending on the network state of the station. Such stations are referred to as "10M8 stations". Stations implemented under a previous version of the HPNA specification ("HPNA 1.x") supported only the 1 mbps data rate. Such stations are referred to as "1M8 stations".

There are three possible network states for 10M8 stations: V1M2 mode, 1M8 mode, and 10M8 mode. 10M8 stations in the 1M8 mode transmit only 1M8 format frames, with a private communication (PCOM) field set to 1 or 2. The PCOM is a field in the frame. Its information is used by the PHY 110 in node-to-node communications. The PCOM field is set as follows:

PCOM=0 refers to a 1M8 station;

PCOM=1 refers to a 10M8 station functioning in V1M2 mode or 1M8 mode if V1_DETECTED is not asserted; and PCOM=2 indicates a 10M8 station functioning in V1M2 mode or 1M8 mode if V1_DETECTED is asserted.

The signal, V1_DETECTED, is described further below.

10M8 stations in the 10M8 mode transmit only 10M8 format frames. 10M8 stations in the V1M2 mode transmit either 1M8 format frames to 1M8 stations with a PCOM set to 1 or 2, or 10M8 compatible format frames to 10M8 stations. The 10M8 compatible frame contains a gap within the data frames. This "gap frame" provides interoperability between the format frames under HPNA 2.0 and HPNA 1.x.

The following equations set forth the three modes possible for a 10M8 station:

V1M2_MODE=(not ConfigV1) and ((not ConfigV2) or ConfigV1M2) and (ConfigV1M2 or V1_DETECTED or V1_SIGNALED)

1M8_MODE:=ConfigV1

10M8_MODE:=not (V1M2_MODE or 1M8_MODE)

ConfigV1M2 is a signal which forces a station into the V1M2 mode. ConfigV1 is a signal which forces a station into the 1M8 mode. ConfigV2 is a signal which forces a station into the 10M8 mode.

V1_DETECTED is a signal which is asserted when a 10M8 station, while in 10M8 Mode and with Link Integrity Status=DOWN, detects a 1M8 format frame with a PCOM=1. V1_DETECED is also asserted when a 10M8 station detects a 1M8 format frame with a PCOM=0. The Link Integrity Status indicates whether or not the station is connected with another station. If the station is disconnected, then the Link Integrity Status=DOWN. If the station is connected, then the Link Integrity Status=UP.

V1_SIGNALED is a signal which is asserted when a 10M8 station detects or transmits a 1M8 format frame with a PCOM=2.

Conventionally, the three network states under HPNA 2.0 are implemented in software. However, the response time may be slow.

Accordingly, there exists a need for an implementation of the HPNA 2.0 network states in hardware. The present invention addresses such a need.

SUMMARY OF THE INVENTION

A network state machine which implements the three network states of HPNA 2.0 in hardware has been disclosed. The network state machine implements the three network states using two network states. When a station is in the V1M2 mode, instead of transmitting this frame in the 10M8 format frame with the gap frame, the frame is transmitted in the 1M8 format frame without any gaps in the frame. By implementing this in hardware, the network state machine has a faster response time.

DETAILED DESCRIPTION

The present invention provides an implementation of the HPNA 2.0 network states in hardware. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 1:
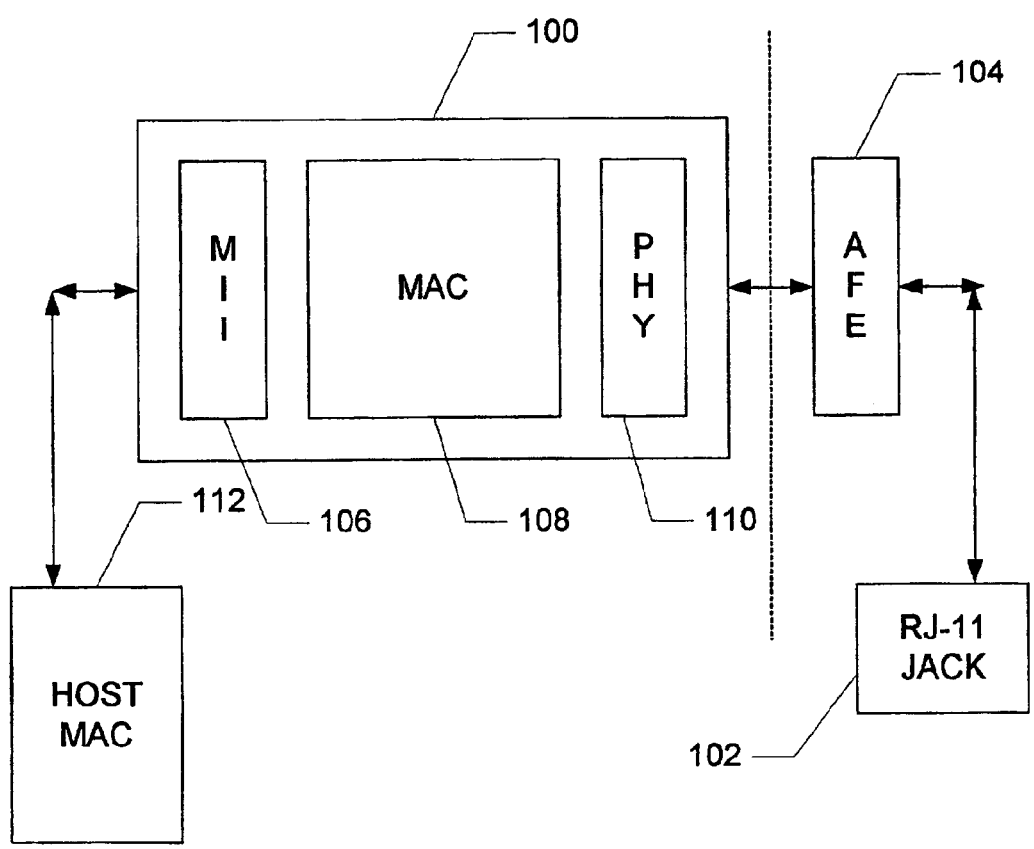
FIG. 1 illustrates a home phone line network.
Figure 2:
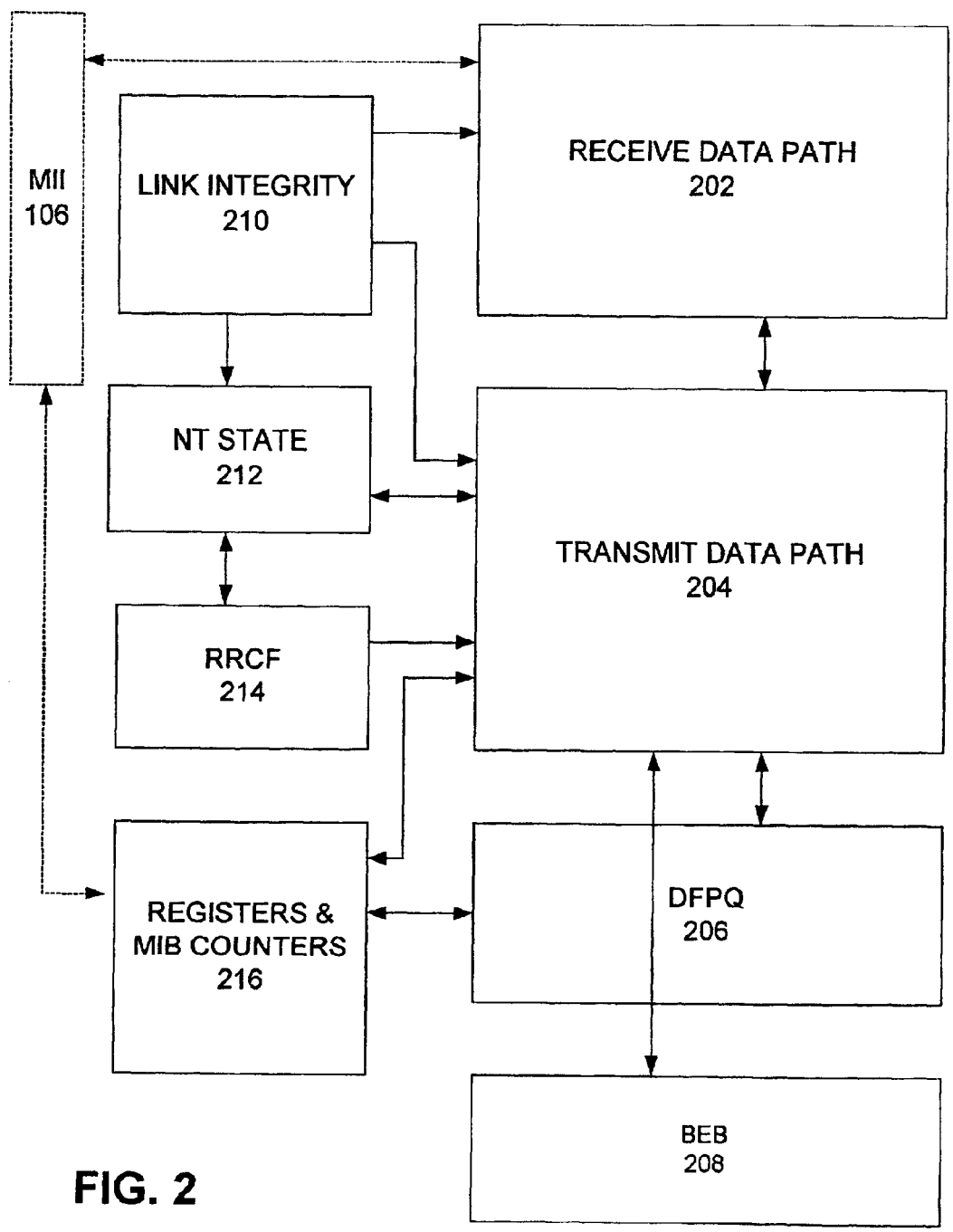
FIG. 2 illustrates a preferred embodiment of the Media Access Control in accordance with the present invention.

FIG. 2 illustrates a preferred embodiment of the MAC 108 in accordance with the present invention. The MAC 108 comprises a Receive Data Path 202, a Transmit Data Path 204, a Distributed Fair Priority Queuing (DFPQ) 206, a Binary Exponential Backoff (BEB) 208, a Link Integrity 210, a Network State 212, a Rate Request Control Frame (RRCF) 214, a plurality of registers and Management Information Base (MIB) counters 216.

The Receive Data Path 202 receives data packets from the PHY 110 and sends data packets to the MII 106. In the preferred embodiment, after each data packet sent by the Receive Data Path 202, another packet, referred to herein as a "frame status frame", is sent immediately following. The frame status frame contains certain status information required by subsequent processes.

The Transmit Data Path 204, which receives data packets from the MII 106 and transmits them to the PHY 110.

The DFPQ 206 and the BEB 208 provide collision resolution. The DFPQ 206 provides collision resolution for the 10 mpbs data rate, while the BEB 208 provides collision resolution for the 1 mpbs data rate. In the preferred embodiment, the PHY 110 will provide a collision detect signal. Either the DFPQ 206 or the BEB 208 will then attempt to resolve the collision.

The Link Integrity 210 monitors the physical network conditions. In the preferred embodiment, the Link Integrity 210 updates a link status bit in a link register. The Link Integrity 210 also sends link packets in accordance with HPNA 2.0.

The RRCF block 214 sends a RRCF whenever the MAC 108 transitions between data rates. The RRCF is used to perform the rate negotiation function, i.e., to determine what is the data rate to communicate between different stations in a home phone line network.

The registers and MIB counters 216 provides programmability to the MAC 108 and handles error event counting.

The Network State 212 in accordance with the present invention monitors he current mode of the MAC 108, i.e., whether the MAC 108 is operating in the 1M8 mode, the V1M2 mode, or the 10M8 mode.

To support the three network states under HPNA 2.0 using two network states, the three network state equations for V1M2_MODE, 1M8MODE, and 10M8_MODE, set forth in the Background, are collapsed into two equations. To accomplished this, when a 10M8 station is in the V1M2 mode, instead of transmitting this frame in the 10M8 compatible format, the frame is transmitted in the 1M8 format frame without any gaps in the frame. Thus, the following equations apply:

V1M2_MODE=1M8_MODE

ConfigV1M2=ConfigV1

Using the above equations, the three network state equations set forth in HPNA 2.0 becomes the following:

1M8_MODE:=(ConfigV1 or ConfigV1M2) or (not ConfigV2 and (V1_SIGNALED or V1_DETECTED)

10M8_MODE:=not 1M8_MODE

The definitions for ConfigV1, ConfigV1M2, ConfigV2, V1_SIGNALED, and V1_DETECTED remain unchanged.

In this manner, the three network states of HPNA 2.0 is supported using two network states.

Figure 3:
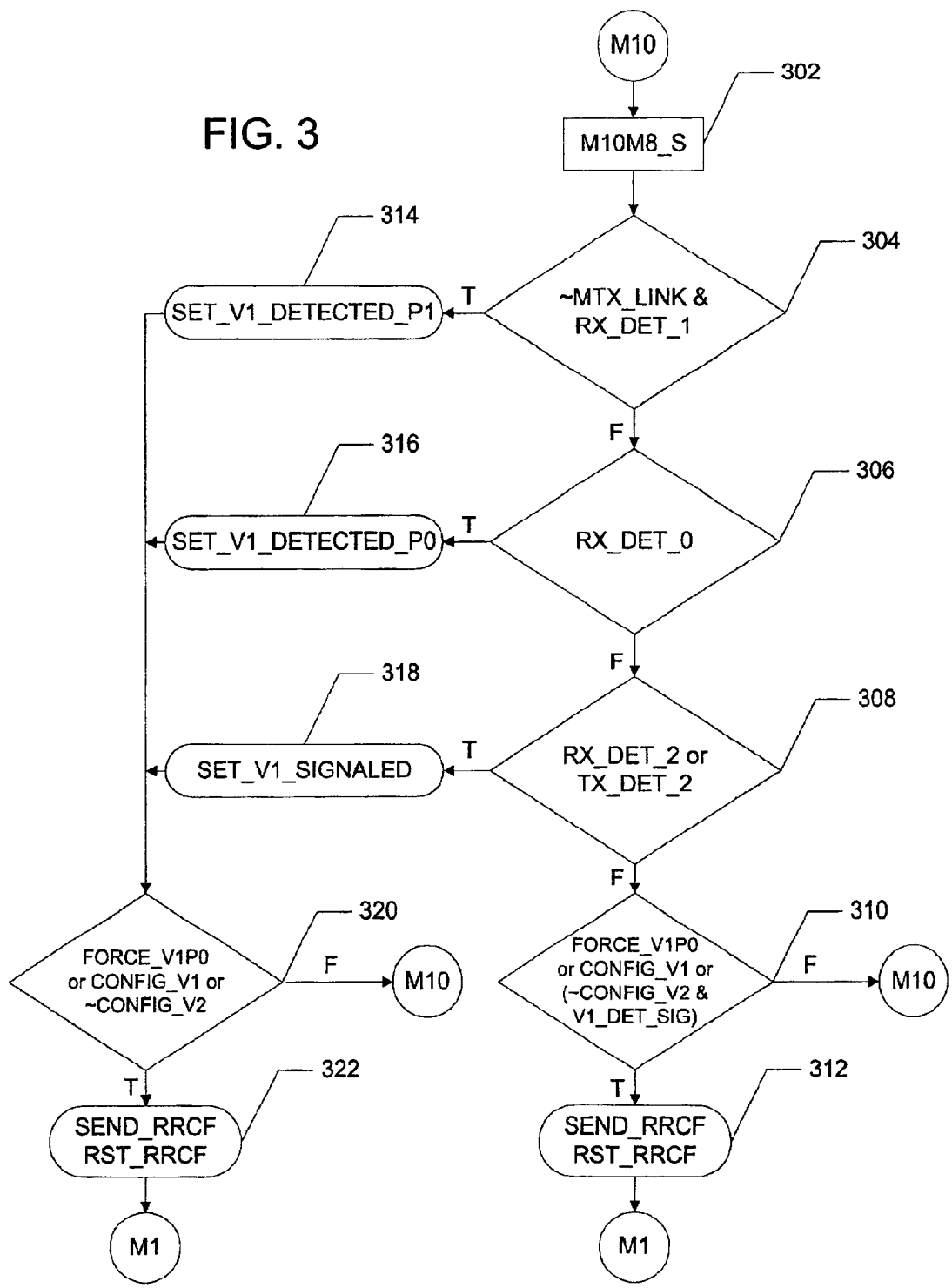
FIG. 3 is a flow diagram illustrating an implementation in hardware of the 10M8 mode by the network state machine in accordance with the present invention.

FIG. 3 is a flow diagram illustrating an implementation in hardware of the 10M8 mode by the network state machine in accordance with the present invention. A 10M8 station is currently in the 10M8 mode when the M10M8_S signal is asserted, via step 302. Next, if the MTX_LINK signal is not asserted and the RX_DET_1 signal is asserted, via step 304, then the SET_V1_DETECTED_P1 signal is asserted, via step 314. The MTX_LINK signal is asserted when the Link Integrity status is "UP" and not asserted when the status is "DOWN". The RX_DET_1 signal is asserted when the 10M8 station receive detects a 1M8 frame with a PCOM=1. The assertion of the SET_V1_DETECTED_P1 asserts the V1_DETECTED signal with a PCOM value of "1".

If the MTX_LINK signal is asserted or the RX_DET_1 signal is not asserted, then the Network State 212 determines if the RX_DET_0 signal is asserted, via step 306. The RX_DET_0 signal is asserted when the 10M8 station receive detects a 1M8 frame with a PCOM=0. If RX_DET_0 signal is asserted, then the SET_V1_DETECTED_P0 signal is asserted, via step 316. The assertion of the SET_V1_DETECTED_P0 signal asserts the V1_DETECTED signal with a PCOM=0.

If the RX_DET_0 signal is not asserted, then the Network State 212 determines if either the RX_DET_2 signal or the TX_DET_2 signal is asserted, via step 308. The RX_DET_2 signal is asserted when the 10M8 station receive detects a 1M8 frame with a PCOM=2. The TX_DET_2 signal is asserted when the 10M8 station transmit detects a 1M8 frame with a PCOM=2. If either of these signals is asserted, then the SET_V1_SIGNALED signal is asserted, via step 318. The asserted SET_V1_SIGNALED signal asserts the V1_SIGNALED signal.

If neither the RX_DET_2 nor the TX_DET_2 signal is asserted, then the Network State 212 determines if the FORCE_V1P0 signal is asserted, or the CONFIG_V1 signal is asserted, or if there is a combination of the CONFIG_V2 signal not being asserted and the V1_DET_SIG signal being asserted, via step 310. The FORCE_V1P0 signal is asserted when the 10M8 station is to be forced into the 1M8 mode with a PCOM=0. The CONFIG_V1 signal is asserted when the 10M8 station is to be forced into the 1M8 mode with a PCOM=1. The CONFIG_V2 signal is asserted when the 10M8 station is to be forced into the 10M8 mode. The V1_DET SIG signal is asserted when either the V1_DETECTED or the V1_SIGNALED signals are asserted. Step 310 implements the following equation for the 1M8 mode, described above:

1M8_MODE:=(ConfigV1 or ConfigV1M2) or (not ConfigV2 and (V1_SIGNALED or V1_DETECTED)

If step 310 is determined to be "false", then the 10M8 station continues to function in the 10M8 mode. If step 310 is determined to be "true", then the 10M8 station is forced into the 1M8 mode. In doing so, the SEND_RRCF and the RST_RRCF signals are asserted, via step 312. The asserted SEND_RRCF signal causes a RRCF to be sent. After the RRCF is sent, counters in the RRCF 214 is reset by asserting the RST_RRCF signal.

If either the V1_DETECTED or the V1_SIGNALED signals are asserted, via step 314–318, then the Network State 212 if the FORCE_V1P0 or the CONFIG_V1 signal is asserted or if the CONFIG_V2 signal is not asserted, via step 320. Step 320 implements the same equation for the 1M8 mode as step 310, however, since it is already known that either the V1_DETECTED or the V1_SIGNALED signals have been asserted, that determination is not required at step 320. If step 320 is determined to be "false", then the 10M8 station continues to function in the 10M8 mode. If step 320 is determined to be "true", then the 10M8 station is forced into the 1M8 mode. In doing so, the SEND_RRCF and the RST_RRCF signals are asserted, via step 322.

Figure 4:
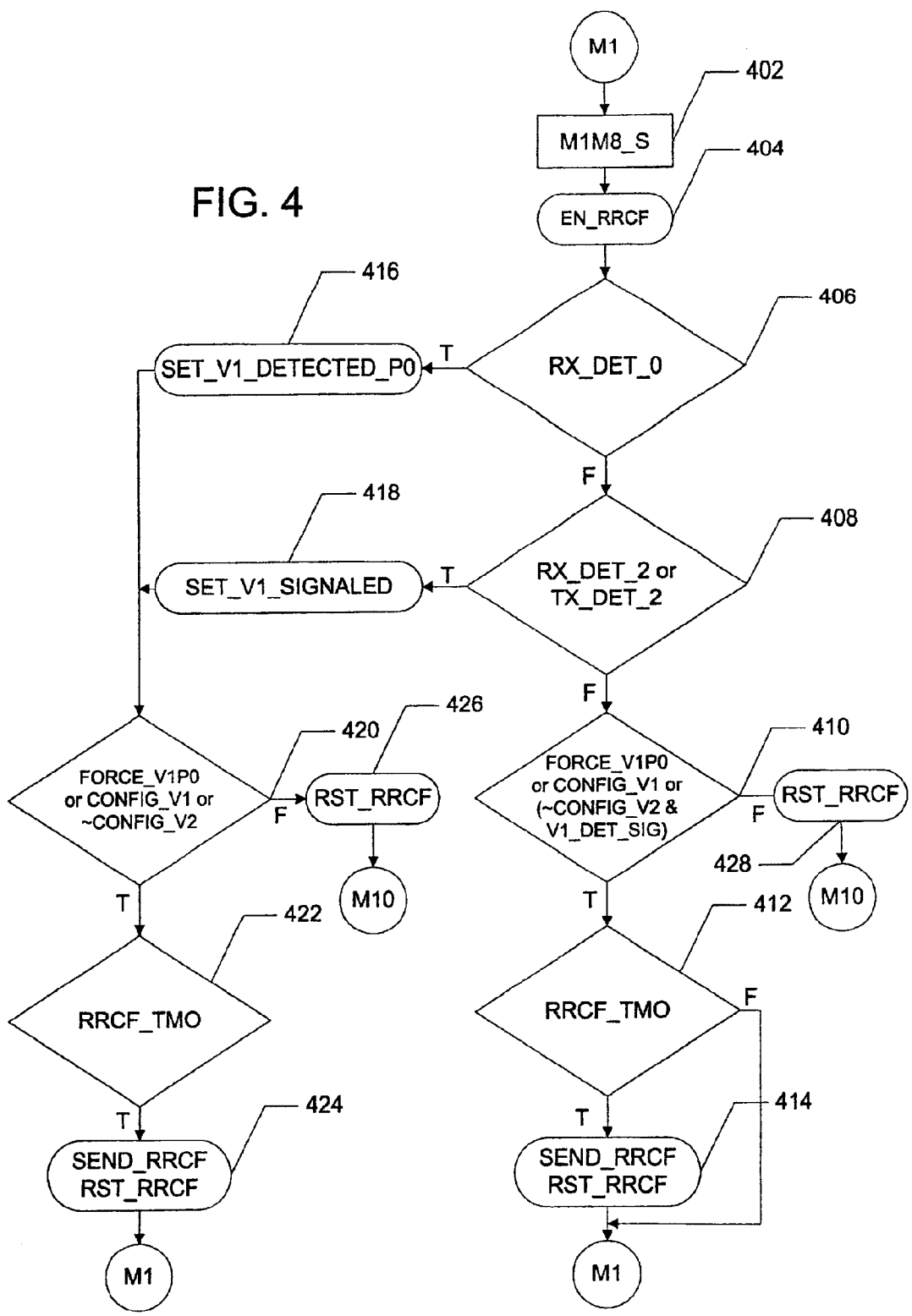
FIG. 4 is a flow diagram illustrating an implementation in hardware of the 1M8 mode by the network state machine in accordance with the present invention.

FIG. 4 is a flow diagram illustrating an implementation in hardware of the 1M8 mode by the network state machine in accordance with the present invention. The 10M8 station is currently in the 1M8 mode when the M1M8_S signal is asserted, via step 402. Next, the counters in the RRCF 214 are enabled by asserting the EN_RRCF signal, via step 404. Next, if the RX_DET_0 signal is asserted, via step 406, then the SET_V1_DETECTED_P0 signal is asserted, via step 416.

If the RX_DET_0 signal is not asserted, then the Network State 212 determines if either the RX_DET_2 signal or the TX_DET_2 signal is asserted, via step 408. If either of these signals is asserted, then the SET_V1_SIGNALED signal is asserted, via step 418.

If neither the RX_DET_2 nor the TX_DET_2 signal is asserted, then the Network State 212 determines if the FORCE_V1P0 signal is asserted, or the CONFIG_V1 signal is asserted, or if there is a combination of the CONFIG_V2 signal not being asserted and the V1_DET_SIG signal being asserted, via step 410. As with step 310 in FIG. 3, step 410 implements the following equation for the 1M8 mode, described above:

1M8_MODE:=(ConfigV1 or ConfigV1M2) or (not ConfigV2 and (V1_SIGNALED or V1_DETECTED)

If step 410 is determined to be "false", then the 10M8 station resets the counters in the RRCF 214 by asserting the RST_RRCF signal, via step 428, and changes to the 10M8 mode. If step 410 is determined to be "true", then the Network State 212 determines if the RRCF timer has overflowed by determining if the RRCF_TMO signal is asserted, via step 412. The RRCF_TMO signal is asserted when the life-span of the last RRCF has expired. If the RCF_TMO signal is asserted, then the SEND_RRCF and the RST_RRCF signals are asserted to send the RRCF again, via step 414. The 10M8 station then continues in the 1M8 mode.

If either the V1_DETECTED or the V1_SIGNALED signals are asserted, via step 416–418, then the Network State 212 determines if the FORCE_V1P0 or the CONFIG_V1 signal is asserted or if the CONFIG_V2 signal is not asserted, via step 420. As with step 320 of FIG. 3, step 420 implements the same equation for the 1M8 mode as step 410, however, since it is already known that either the V1_DETECTED or the V1_SIGNALED signals have been asserted, that determination is not required at step 420. If step 420 is determined to be "false", then the 10M8 station resets the counters in the RRCF 214 by asserting the RST_RRCF signal, via step 426, and changes to the 10M8 mode. If step 420 is determined to be "true", then the 10M8 station continues in the 1M8 mode. The SEND_RRCF and the RST_RRCF signals are asserted, via step 424, if the RRCF_TMO signal is asserted, via step 422.

A network state machine which implements the three network states of HPNA 2.0 in hardware has been disclosed. The network state machine implements the three network states using two network states. When a station is in the V1M2 mode, instead of transmitting this frame in the 10M8 format frame with the gap frame, the frame is transmitted in the 1M8 format frame without any gaps in the frame. By implementing this in hardware, the network state machine has a faster response time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing network states for a home phone line network, comprising the steps of:
   (a) determining if a receive-detect-with-Private Communication Field (PCOM)=0 signal is asserted;
   (b) asserting a set-detected PCOM=0 signal if the receive-detect-with-PCOM=0 signal is asserted, wherein assertion of the set-detected-PCOM=0 signal asserts a detected signal with a PCOM field set to "0";
   (c) determining if a receive-detect-with-PCOM=2 signal or a transmit-detect-with-PCOM=2 signal is asserted;
   (d) asserting a set-signaled signal if either the receive-detect-with-PCOM=2 signal or the transmit-detect-with-PCOM=2 signal is asserted, wherein assertion of the set-signaled signal asserts a signaled signal;
   (e) determining if a force-first-mode signal is asserted, or a combination of a force-second-mode signal not being asserted and either the detected signal or the signaled signal being asserted;
   (f) setting a network state to a first mode if the force-first-mode signal is asserted, or the combination of the force-second-mode signal not being asserted and either the detected signal or the signaled signal being asserted; and
   (g) setting a network state to a second mode if the network state is not the first mode.

2. The method of claim 1, wherein the determining step (a) further comprises:
   (a1) determining if a current-first-mode signal is asserted and if a current-second-mode signal is asserted;
   (a2) enabling a plurality of counters for a rate request control frame (RRCF), if the current-first-mode signal is asserted;
   (a3) determining if a link-integrity-status signal is asserted and if a receive-detect-with-PCOM=1 signal is asserted, if the current-second-mode signal is asserted; and
   (a4) asserting a set-detected-PCOM=1 signal, if the link-integrity-status signal and the receive-deceive-with-PCOM=1 signal is asserted, wherein assertion of the set-detected-PCOM=1 signal asserts the detected signal with a PCOM set to "1".

3. The method of claim 2, wherein the current-first-mode signal is asserted when a station is in a 1M8 mode under a Home Phone Line Networking Alliance specification version 2.0 ("HPNA 2.0").

4. The method of claim 2, wherein the current-second-mode signal is asserted when a station is in a 10M8 mode under a HPNA 2.0.

5. The method of claim 2, wherein the link-integrity-status signal is asserted when a station is connected to another station in the network.

6. The method of claim 2, wherein the receive-detect-with-PCOM=1 signal is asserted when a station detects receiving a 1M8 format frame with a PCOM field set to "1".

7. The method of claim 6, wherein the PCOM field set to "1" refers to a station in a V1M2 mode or a station in a 1M8 mode if the detected signal is not asserted.

8. The method of claim 2, wherein assertion of the set-detected-PCOM=1 signal asserts the detected signal with a PCOM field set to "1".

9. The method of claim 1, wherein the receive-detect-with-PCOM=0 signal is asserted when a station detects receiving a 1M8 format frame with a PCOM field set to "0".

10. The method of claim 9, wherein the PCOM field set to "0" refers to a station which supports a 1 megabit-per-second (mpbs) data rate but not a 10 mpbs data rate.

11. The method of claim 1, wherein assertion of the set-detected-PCOM=0 signal asserts the detected signal.

12. The method of claim 1, wherein the receive-detect-with PCOM=2 signal is asserted when a station detects receiving a 1M8 frame with a PCOM field set to "2".

13. The method of claim 11, wherein the PCOM field set to "2" refers to a station in a V1M2 mode or a station in a 1M8 mode if the signaled signal is asserted.

14. The method of claim 1, wherein the transmit-detect-with-PCOM=2 signal is asserted when a station detects transmission of a 1M8 format frame with a PCOM field set to "2".

15. The method of claim 1, wherein assertion of the set-signaled signal asserts the signaled signal.

16. The method of claim 1, wherein the setting step (f) further comprises:
(f1) setting the network state to the first mode if a force-third-mode signal is asserted.

17. The method of claim 16, wherein the force-third-mode signal is a ConfigV1M2 signal under HPNA 1.0, wherein asserting the ConfigV1M2 signal forces a station into a V1M2 mode.

18. The method of claim 1, wherein the force-first-mode signal is ConfigV1 signal under HPNA 2.0, wherein asserting the ConfigV1 signal forces a station into a 1M8 mode.

19. The method of claim 1, wherein the force-second-mode signal is a ConfigV2 signal under HPNA 2.0, wherein asserting the ConfigV2 signal forces a station into a 10M8 mode.

20. The method of claim 1, wherein the first mode is a 1M8 mode under HPNA 2.0.

21. The method of claim 1, wherein the second mode is a 10M8 mode under HPNA 2.0.

22. The method of claim 1, wherein the setting step (f) comprises:
(f1) determining if a RRCF-timer-out signal is asserted, if the force-mode signal is asserted or the combination of the force-second-mode signal not being asserted and either the detected signal or the signaled signal being asserted;
(f2) asserting a send-RRCF signal and a reset-RRCF signal, if the RRCF-timer-out signal is asserted; and
(f3) setting the network state to the first mode.

23. The method of claim 22, wherein the RRCF-timer-out signal is asserted when a life span of a last RRCF has expired.

24. The method of claim 22, wherein assertion of the send-RRCF signal sends a RRCF.

25. The method of claim 22, wherein assertion of the reset-RRCF signal resets the plurality of counters for the RRCF.

26. The method of claim 1, wherein the setting step (f) comprises:
(f1) asserting a send-RRCF signal and a reset-RRCF signal; and
(f2) setting the network state to the second mode.

27. The method of claim 1, wherein the setting step (k) comprises:
(k1) asserting a reset-RRCF signal; and
(k2) setting the network state to the second mode.

28. A network state machine, comprising:
a receive-detect-with-Private Communication Field (PCOM)=0, wherein the receive-detect-with-PCOM=0 signal is asserted when a station detects receiving a 1M8 format frame with a PCOM field set to "0";
a set-detected-PCOM=0 signal, wherein the set-detected-PCOM=0 signal is asserted when the receive-detect-with-PCOM=0 signal is asserted, wherein assertion of the set-detected-PCOM=0 signal asserts a detected signal;
a receive-detect-with-PCOM=2 signal, wherein the receive-detect-with-PCOM=2 signal is asserted when the station detects receiving a 1M8 format frame with a PCOM field set to "2";
a transmit-detect-with-PCOM=2 signal, wherein the transmit-detect-with-PCOM=2 signal is asserted when the station detects transmission of a 1M8 format frame with a PCOM field set to "2";
a set-signaled signal, wherein the set-signaled signal is asserted when the receive-detect-with-PCOM=2 signal or the transmit-detect-with-PCOM=2 signal is asserted, wherein assertion of the set-signaled signal asserts a signaled signal;
a force-first-mode signal, wherein the force-first-mode signal is asserted when the station is to be forced into the 1M8 mode;
a force-second-mode signal, wherein the force-second-mode signal is asserted when the station is to be forced into the 10M8 mode;
wherein a network state of the station is set to the 1M8 mode if the force-first-mode signal is asserted, or a combination of the force-second-mode signal not being asserted and either the detected signal or the signaled signal being asserted,
wherein the network state is set to the 10M8 mode if the network state is not the 1M8 mode.

29. The method of claim 28, further comprising:
a current-first-mode signal, wherein the current-first-mode signal is asserted when a station is in a 1M8 mode;
a current-second-mode signal, wherein the current-second-mode signal is asserted when the station is in a 10M8 mode;
a link-integrity-status signal, wherein the link-integrity-status signal is asserted when the station is connected to another station in a network;
a receive-detect-with-PCOM=1 signal, wherein the receive-detect-with-PCOM=1 signal is asserted when the station detects receiving a 1M8 format frame with a PCOM field set to "1";
a set-detected-PCOM=1 signal, wherein the set-detected-PCOM=1 signal is asserted when the link-integrity-status signal and the receive-detect-with-PCOM=1 signal is asserted and if the current-second mode signal is asserted, wherein assertion of the set-detected-PCOM=1 signal asserts the detected signal with a PCOM set to "1".

30. The machine of claim 29, wherein the PCOM field set to "1" refers to a station in the V1M2 mode or a station in the 1M8 mode if the detected signal is not asserted.

31. The machine of claim 28, wherein the PCOM field set to "0" refers to a station which supports a 1 mpbs data rate but not a 10 mpbs data rate.

32. The machine of claim 28, wherein the PCOM field set to "2" refers to a station in a V1M2 mode or a station in the 1M8 mode if the signaled signal is asserted.

33. The machine of claim 28, further comprising a force-third-mode signal, wherein the force-third-mode signal is a ConfigV1M2 signal under HPNA 2.0, wherein the network state is set to the 1M8 mode if the force-third-mode signal is asserted.

34. The machine of claim 28, wherein the force-first-mode signal is a ConfigV1 signal under HPNA 2.0.

35. The machine of claim 28, wherein the force-second-mode signal is a ConfigV2 signal under HPNA 2.0.

36. The machine of claim 28, further comprising:
a RRCF-timer-out signal, wherein the RRCF-timer-out signal is asserted when a life span of a last RRCF has expired;
a send-RRCF signal, wherein the send-RRCF signal is asserted when the network state is to be set to the 1M8 mode, or the RRCF-timer-out signal is asserted and the network state is to be set to the 1M8 mode, wherein assertion of the send-RRCF signal sends a RRCF;
a reset-RRCF signal, wherein the reset-RRCF signal is asserted after the send-RRCF signal is asserted, wherein assertion of the reset-RRCF signal resets a plurality of counters for a RRCF.

* * * * *